US012168343B2

(12) United States Patent
Yamazaki

(10) Patent No.: US 12,168,343 B2
(45) Date of Patent: Dec. 17, 2024

(54) RECORDING DEVICE AND RECORDING METHOD FOR RECORDING DEVICE

(71) Applicant: SEIKO EPSON CORPORATION, Tokyo (JP)

(72) Inventor: Shinya Yamazaki, Higashichikuma-Gun Asahi-Mura (JP)

(73) Assignee: Seiko Epson Corporation, Tokyo (JP)

( * ) Notice: Subject to any disclaimer, the term of this patent is extended or adjusted under 35 U.S.C. 154(b) by 136 days.

(21) Appl. No.: 17/823,137

(22) Filed: Aug. 30, 2022

(65) Prior Publication Data

US 2023/0068296 A1 Mar. 2, 2023

(30) Foreign Application Priority Data

Aug. 31, 2021 (JP) ................................ 2021-140970

(51) Int. Cl.
*B41J 11/00* (2006.01)
*B41J 2/12* (2006.01)
*B41J 13/10* (2006.01)
*B65H 5/06* (2006.01)

(52) U.S. Cl.
CPC ............ *B41J 11/0015* (2013.01); *B41J 2/12* (2013.01); *B41J 13/10* (2013.01); *B65H 5/062* (2013.01); *B41J 2203/01* (2020.08)

(58) Field of Classification Search
CPC ............. B41J 2/04541; B41J 11/00242; B41J 11/00244; B41J 29/38; B41J 11/0015; B41J 2/12; B41J 13/10; B41J 2203/01; B41J 2/21; B41J 11/0095; B65H 5/062
See application file for complete search history.

(56) References Cited

U.S. PATENT DOCUMENTS

2009/0295856 A1* 12/2009 Yoshida ................ B41J 11/008
347/16

FOREIGN PATENT DOCUMENTS

JP 2014-148138 A 8/2014

* cited by examiner

*Primary Examiner* — Jannelle M Lebron
(74) *Attorney, Agent, or Firm* — WORKMAN NYDEGGER

(57) ABSTRACT

A recording device includes a recording head for performing recording on a recording medium, a transporter for transporting the recording medium, a platen for supporting the recording medium, a heater for heating the recording medium supported by the platen, and a control unit, wherein the control unit causes the heater to heat the recording medium at a predetermined and constant heating temperature, causes the recording head and the transporter to record a first test pattern of a predetermined recording density, and a second test pattern of a recording density different from the predetermined recording density on the recording medium, and the recording density of the first test pattern and the recording density of the second test pattern can be set in the heater, and are associated with heating temperature different from each other.

10 Claims, 5 Drawing Sheets

| | HEATING TEMPERATURE OF HEATER 18 (°C) | RECORDING DENSITY (%Duty) | HEATING TEMPERATURE REPRODUCED (°C) |
|---|---|---|---|
| FIRST TEST PATTERN PTN1 | 40 | 100 | 40 |
| SECOND TEST PATTERN PTN2 | 40 | 10 | 45 |
| THIRD TEST PATTERN PTN3 | 40 | 200 | 35 |

| | HEATING TEMPERATURE OF HEATER 18 (°C) | RECORDING DENSITY (%Duty) | HEATING TEMPERATURE REPRODUCED (°C) |
|---|---|---|---|
| FIRST TEST PATTERN PTN1 | 40 | 100 | 40 |
| SECOND TEST PATTERN PTN2 | 40 | 10 | 45 |
| THIRD TEST PATTERN PTN3 | 40 | 200 | 35 |

RECORDING DEVICE AND RECORDING METHOD FOR RECORDING DEVICE

The present application is based on, and claims priority from JP Application Serial Number 2021-140970, filed Aug. 31, 2021, the disclosure of which is hereby incorporated by reference herein in its entirety.

BACKGROUND

1. Technical Field

The present disclosure relates to a recording device and a recording method for a recording device.

2. Related Art

In the past, a recording device has been known that includes a heater that heats ink caused to adhere to a recording medium. Depending on a heating temperature of the heater, wrinkles may be generated in the recording medium, or the ink may be insufficiently dried. For example, JP 2014-148138 A discloses a printing apparatus in which a heating temperature of a heater is set in accordance with an analysis result of electronic data for performing printing.

However, in the printing apparatus described in JP 2014-148138 A, there has been a problem that it is difficult to set an appropriate heating temperature. Specifically, there are wide variety of elements related to the setting of the heating temperature of the heater, such as a material and surface processing of a recording medium, a type and physical properties of ink, and printing environments. Therefore, it was difficult to cover the above-described elements.

In addition, although a method is most reliable that determines an appropriate heating temperature by test printing while actually changing a heating temperature, the method had a problem that it was difficult to perform in a short period of time. Specifically, after a set temperature is changed, and a temperature of the heater is raised or lowered, a long period of time is required to stabilize a temperature. That is, there has been a demand for a recording device in which an appropriate heating temperature of a heater is easily set.

SUMMARY

A recording device includes a recorder configured to apply a liquid droplet to a recording medium to record an image, a transporter configured to transport the recording medium in a transport direction via a region facing the recorder, a supporter configured to support the recording medium, in the region facing the recorder, a heater configured to heat the recording medium supported by the supporter, and a controller configured to control the recorder, the transporter, and the heater, wherein the controller causes the heater to heat, at a predetermined and constant heating temperature, the recording medium supported by the supporter, causes the recorder and the transporter to record, on the recording medium as a test pattern, a first test pattern of a predetermined recording density, and a second test pattern of a recording density different from the predetermined recording density, and the recording density of the first test pattern, and the recording density of the second test pattern are settable in the heater, and associated with heating temperatures different from each other.

A recording device includes a recorder configured to apply a liquid droplet to a recording medium to record an image, a transporter configured to transport the recording medium in a transport direction via a region facing the recorder, a supporter configured to support the recording medium, in the region facing the recorder, a heater configured to heat the recording medium supported by the supporter, and a controller configured to control the recorder, the transporter, and the heater, wherein the controller causes the heater to heat the recording medium supported by the supporter, at a predetermined and constant heating temperature, causes the recorder and the transporter to record a test pattern with a predetermined recording density on the recording medium, and the recording density of the test pattern is associated with a heating temperature settable in the heater.

A recording method for a recording device is a recording method for a recording device that includes a recorder for causing a liquid droplet to adhere to a recording medium to record an image, a transporter for transporting the recording medium in a transport direction via a region facing the recorder, a supporter for supporting the recording medium, in the region facing the recorder, and a heater for heating the recording medium supported by the supporter, wherein the heater heats the recording medium supported by the supporter, at a predetermined and constant heating temperature, the recorder and the transporter record, as a test pattern, a first test pattern of a predetermined recording density, and a second test pattern with a recording density different from the predetermined recording density, on the recording medium, the recording density of the first test pattern, and the recording density of the second test pattern are settable in the heater, and associated with heating temperatures different from each other, and whether a heating temperature corresponding to the recording density of the test pattern is appropriate or not is determined, based on a surface state of a region where heating by the heater at the predetermined and constant heating temperature, and recording of the test pattern by the recorder are performed.

BRIEF DESCRIPTION OF THE DRAWINGS

FIG. 4 is a schematic plan view illustrating a disposition of a distance sensor and the like.

DESCRIPTION OF EXEMPLARY EMBODIMENTS

In the exemplary embodiments described below, a large format type recording device used for printing a signage or the like will be illustrated and described with reference to the drawings.

In each of the drawings, XYZ axes are provided, as necessary, as coordinate axes orthogonal to each other, and a direction indicated by each arrow is referred to as a + direction, and a direction opposite to the + direction is referred to as a − direction. The Y-axis is along a front-rear direction of the recording device. A +X direction and a −X direction, which are along a left-right direction of the recording device, and are directions along the X-axis, may be collectively referred to as an X direction. The Z-axis is a virtual axis along a vertical direction, a +Z direction of the recording device is referred to as an upside, and a −Z direction of the recording device is referred to as a lower side. Note that, for convenience of illustration, a size of each member is made different from that of the actual member.

1. First Exemplary Embodiment

Figure 1:
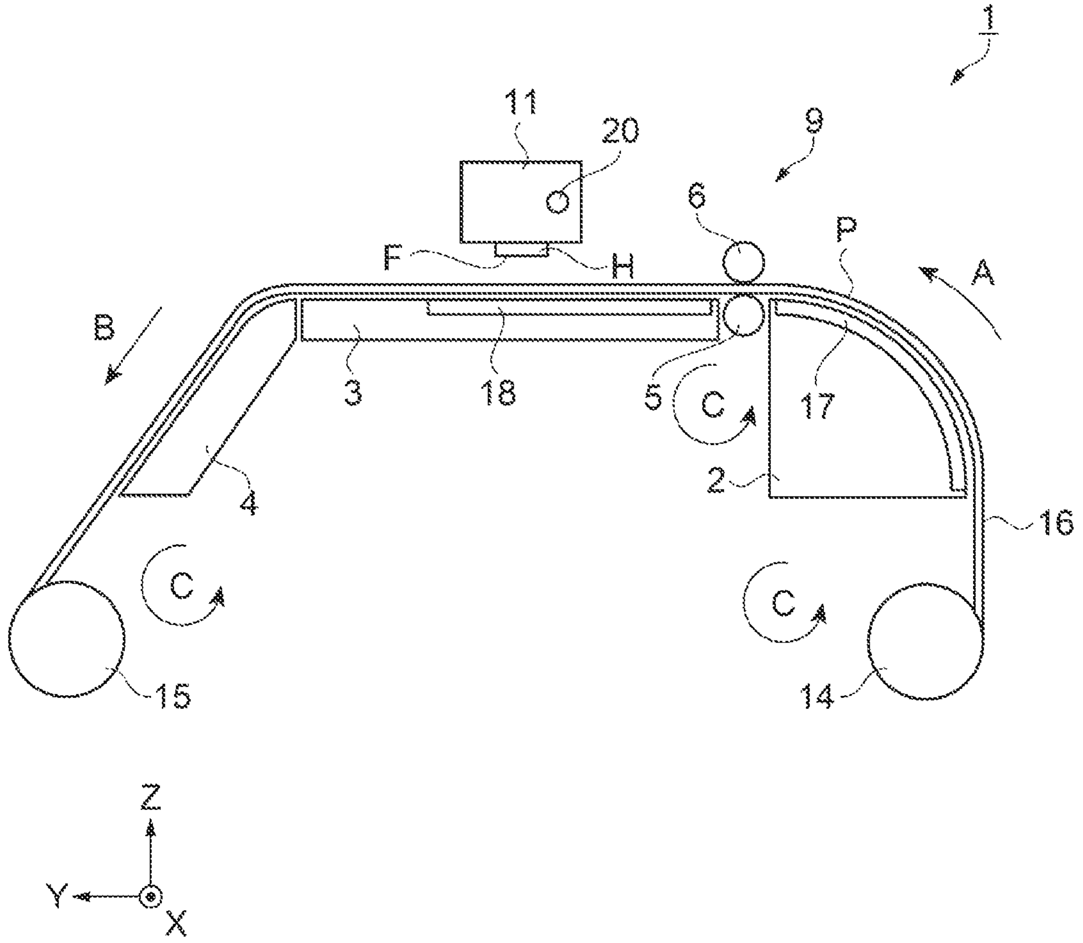
FIG. 1 is a schematic side view illustrating a configuration of a recording device according to a first exemplary embodiment.

As illustrated in FIG. 1, a recording device 1 according to the present exemplary embodiment includes a recording head H as a recorder, a carriage 11, a transporter including a transport unit 9, a platen 3 as a supporter, and a heater 18 as a heater. Although not illustrated, the recording device 1 also includes a distance sensor as a detector, and a control unit as a controller. Note that, in the description of FIG. 1, a state in side view from the +X direction will be described unless otherwise noted. Also, the number of the recording heads H mounted at the carriage 11 is not limited to one.

The recording head H causes an ink droplet to adhere to a recording medium P to record images or the like. The transport unit 9 transports the recording medium P in the +Y direction, which is a transport direction in the platen 3, via a region facing the recording head H. The platen 3 is disposed facing the recording head H in a direction along the Z-axis. The recording medium P is placed and supported on an upper surface of the platen 3, in the above region facing the recording head H. The heater 18 is disposed at the platen 3, and heats the recording medium P supported by the platen 3. The control unit controls the recording head H, the transport unit 9, and the heater 18.

The recording device 1 includes, as the transporter of the recording medium P, a feeding unit 14, support portions 2, 4, a transport unit 9, and a winding unit 15. In the feeding unit 14, the recording medium P in a roll shape before recording is unwound and transported to the platen 3. In the winding unit 15, the recording medium P after recording is wound in a roll shape. In other words, the roll-shaped recording medium P can be applied to recording by the recording device 1. The recording medium P is not limited to be in the roll shape, and may have a single sheet shape.

The recording medium P is transported by the transport unit 9 from the feeding unit 14. At this time, the roll-shaped recording medium P is rotated and unwound, for example, in a rotational direction C, such that a recording surface 16 faces upward on the platen 3.

The recording medium P unwound and transported upward from the feeding unit 14 reaches the support portion 2. A range of the support portion 2 in contact with the recording medium P is formed in an arc shape. The support portion 2 includes a preheater 17 as a preheater. The preheater 17 is located upstream the heater 18 in the transport direction of the recording medium P, and heats the recording medium P in advance before recording by the recording head H.

The preheater 17 is, for example, an electrothermal heater. A width in the X direction of the preheater 17 is approximately equal to a width in the X direction of the support portion 2, and is larger than a width in the X direction of the recording medium P. Therefore, the recording medium P is transported in a transport direction A while being supported by the support portion 2, and thus an entire surface is heated by the preheater 17. According to the control unit described below, a heating temperature of the preheater 17 is set to be higher than a heating temperature of the heater 18.

A heating load for the recording medium P by the heater 18 disposed downstream can be reduced by preheating by the preheater 17, to improve efficiency of heating by the heater 18. Further, the recording medium P is prevented from being rapidly heated by the heater 18, and thus occurrence of defects such as deformation in the recording medium P is suppressed.

The heating temperature of the preheater 17 is appropriately set depending on a type of the recording medium P or ink. Although not particularly limited, for example, the heating temperature of the preheater 17 is set to be higher than the heating temperature of the heater 18 by about 10° C. to 15° C. For example, when the heating temperature of the heater 18 is set to 40° C., the heating temperature of the preheater 17 is set to 55° C. The heating temperature of the preheater 17 is basically fixed, but may be changed as appropriate. Then, the recording medium P reaches the transport unit 9 via the support portion 2.

The transport unit 9 includes a driving roller 5 and a driven roller 6. The driving roller 5 and the driven roller 6 are disposed between the support portion 2 and the platen 3. The driven roller 6 is located above the driving roller 5. The driving roller 5 and the driven roller 6 are each cylindrical, and each rotational axis is along the X-axis.

The driving roller 5 and the driven roller 6 rotate sandwiching the recording medium P to transport the recording medium P in the +Y direction. Specifically, the driving roller 5 and the driven roller 6 unwind and pull out the roll-shaped recording medium P from the feeding unit 14, and transport the recording medium P via the support portion 2 to the platen 3. The driving roller 5 rotates in the rotation direction C, which is counterclockwise, by driving of a transport motor described below. The driven roller 6 rotates clockwise corresponding to the rotation of the driving roller 5. As a result, the recording medium P reaches the platen 3 where the recording head H and the recording medium P face each other.

The recording head H is mounted at the carriage 11. The recording head H is disposed below the carriage 11, so as to face in the −Z direction. The recording head H includes a nozzle surface F in the −Z direction. A nozzle described later is provided at the nozzle surface F. An ink droplet is discharged from the nozzle.

A pipe from an ink tank (not illustrated) is coupled to the recording head H. In the ink tank, a color ink that exhibits each color or a white ink is individually stored. In addition, a processing liquid such as a pretreatment agent or a coating liquid may be stored in the ink tank. In the present specification, liquids such as ink and a processing liquid are collectively referred to as ink.

The nozzle surface F of the recording head H is disposed facing the platen 3 via the recording medium P when the recording device 1 performs recording. The recording head H is an ink jet head that is driven for discharge by a piezoelectric element. The means for driving for discharge in the recording head H is not limited to the piezoelectric element.

The carriage 11 is disposed facing the platen 3. The carriage 11 is supported by a guide shaft 20 extending along a width direction X of an end portion side in the −Y direction, and reciprocates in the X direction with respect to the recording medium P by a carriage driving unit (not illustrated). In other words, the carriage 11 is scanned in the X direction intersecting the +Y direction in which the recording medium P is transported on the platen 3. The carriage driving unit applies driving force for reciprocation to the carriage by a carriage motor described below. A position in the X direction of the carriage 11 is detected by an encoder (not illustrated) provided in the carriage driving unit.

An upper surface of the platen 3 is formed in a flat plate shape. The upper surface of the platen 3 is substantially along an XY plane. At the platen 3, an ink droplet is discharged from the recording head H onto the recording medium P. At this time, the recording medium P is transported in the −Y direction while being supported by the upper surface of the platen 3. Also, the recording head H is scanned in the X direction. Therefore, the recording head H can be scanned relatively in the X direction for the recording medium P, and can move relatively in a direction along the Y-axis. As a result, images, texts, patterns and the like are formed on the recording medium P, and recording is performed. In the following description, the recording medium P on which recording is performed may be referred to as a record.

The heater 18 is, for example, an electrothermal heater. A length in a direction along the Y-axis of the heater 18 is, for example, approximately 150 mm. A width in the X direction of the heater 18 is approximately equal to a width in the X direction of the platen 3, and is larger than a width in the X direction of the recording medium P. Therefore, the recording medium P is transported in the +Y direction while being supported by the platen 3, and thus an entire surface is heated by the heater 18. The heating temperature of the heater 18 is set to be lower than the heating temperature of the preheater 17, by the control unit described below. The heating temperature of the heater 18 is appropriately set depending on a type of the recording medium P or ink. The heating temperature of the heater 18 can be set to, for example, from 30° C. to 45° C. via the control unit.

When the recording medium P is heated by the heater 18, an ink droplet adhering to the recording medium P is solidified. Specifically, in a water-based resin ink containing relatively high resin and low moisture, solidification of an ink droplet adhering to the recording medium P is promoted. This makes it difficult for the ink droplet to wet and spread out, and thus an image and the like formed by the ink are made high-definition.

In addition, with a typical water-based ink containing relatively high moisture, or a solvent ink, drying of an ink droplet adhering to the recording medium P is promoted by heating. As a result, components other than a solvent contained in the ink are fixed on the recording medium P, and a coating film is formed.

Examples of the recording medium P applied to the recording device 1 include, for example, recording media through which ink adhering to a surface is difficult to penetrate, such as an acrylic resin, polyester such as polyethylene terephthalate, polyvinyl chloride, and coating paper. Many types of such a recording medium P are published in accordance with applications and inks.

When the heating temperature of the heater 18 is too low, color development of an image formed by ink and the like easily deteriorates. In addition, when the heating temperature of the heater 18 is too high, depending on a type or specification of the recording medium P, wrinkles easily occur in the recording medium P. As a result, the heating temperature of the heater 18 is an important parameter that affects quality of a record.

Previously, it was necessary to vary a heating temperature for a try for searching for an appropriate heating temperature. In contrast, the recording device 1 reproduces a state in which, while a heating temperature of the heater 18 is kept constant, a heating temperature is varied in a pseudo manner, and reduces time and effort spent in a trial with different heating temperatures. Details of the present function will be described later. Then, the recording medium P reaches the support portion 4 from the platen 3.

The support portion 4 is disposed in the +Y direction of the platen 3. The +Y direction of the support portion 4 is inclined downward. By the inclination of the support portion 4, the support portion 4 guides the transport direction of the recording medium P from the +Y direction to a transport direction B. The winding unit 15 is provided ahead the inclination of the support portion 4.

The winding unit 15 is rotated by driving of a motor (not illustrated), for example, in the rotation direction C to wind the recording medium P in a roll shape.

Figure 2:
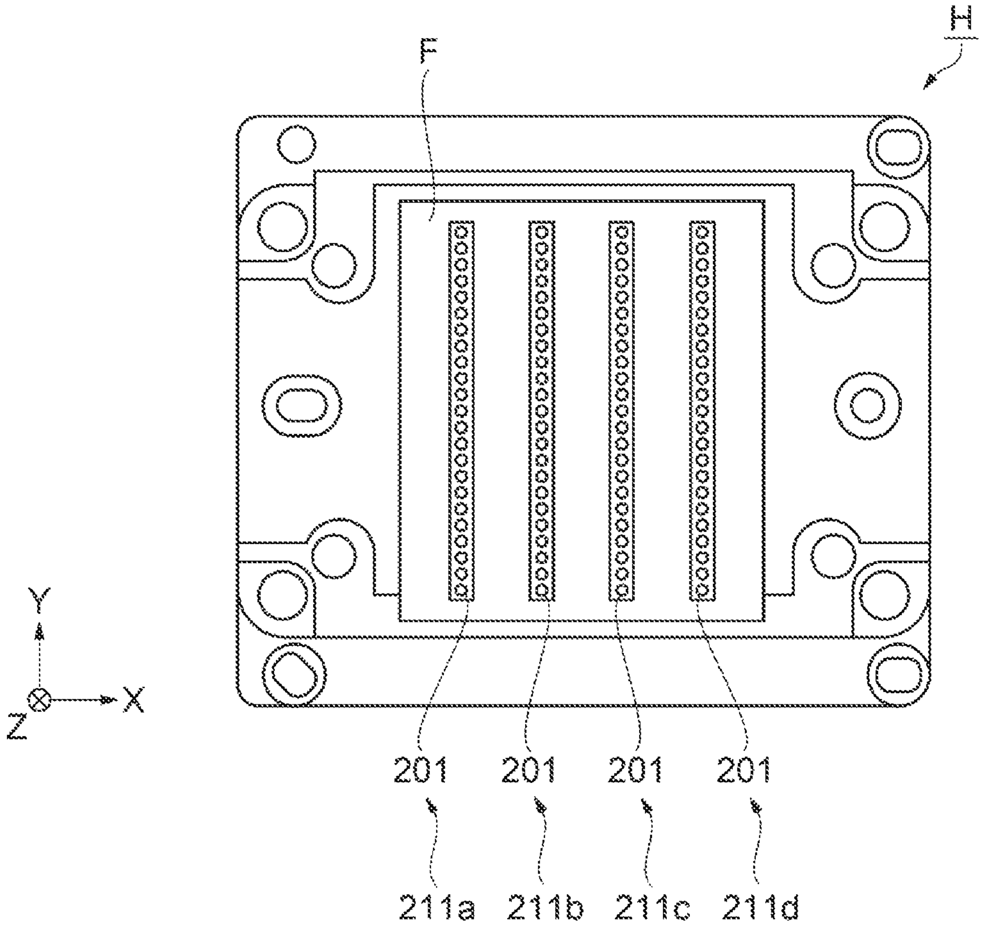
FIG. 2 is a plan view illustrating a configuration of a recording head.
Figure 3:
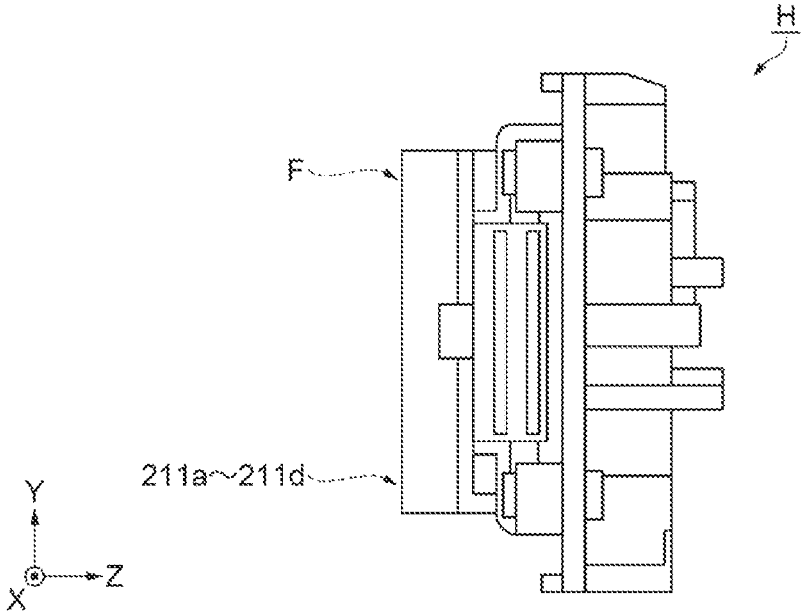
FIG. 3 is a side view illustrating the configuration of the recording head.

As illustrated in FIG. 2 and FIG. 3, in plan view from the −Z direction, the recording head H is substantially rectangular, and the nozzle surface F being substantially rectangular is provided at a center of the recording head H. The nozzle surface F is substantially along the XY plane. The nozzle surface F protrudes from a main body of the recording head H in the −Z direction in side view from the +X direction.

Four nozzle rows 211*a*, 211*b*, 211*c*, and 211*d* are disposed at the nozzle surface F in this order toward the +X direction. Each of the nozzle rows 211*a*, 211*b*, 211*c*, and 211*d* extends along the Y-axis. Each of the nozzle rows 211*a*, 211*b*, 211*c*, and 211*d* includes a plurality of nozzles 201. An ink droplet of a corresponding type is discharged from each nozzle 201 of the nozzle rows 211*a*, 211*b*, 211*c*, and 211*d*. The nozzle row disposed at the nozzle surface F is not limited to the configuration described above.

Figure 4:
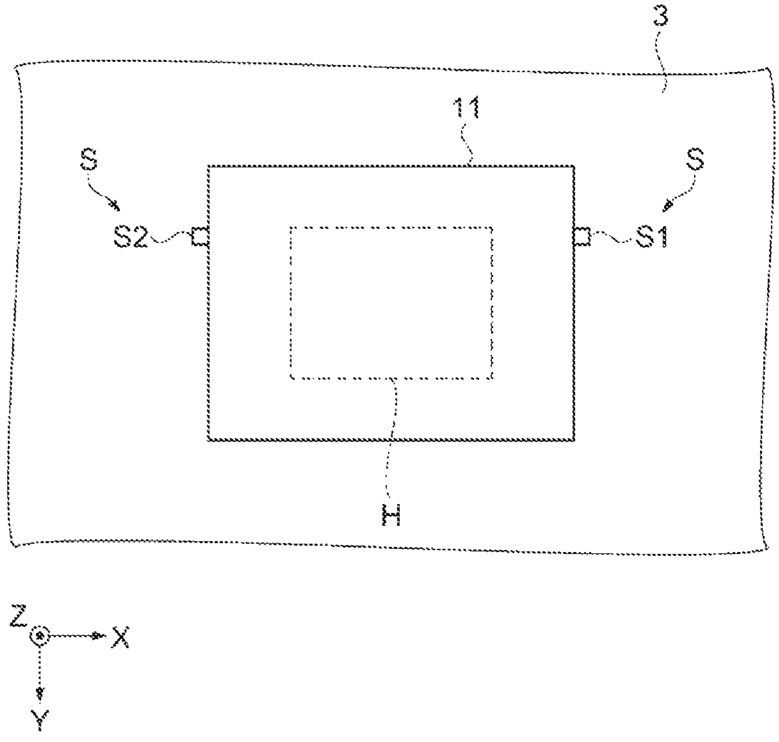

As illustrated in FIG. 4, the carriage 11 has a substantially rectangular shape in plan view from above. The recording head H is mounted below the carriage 11. The carriage 11 is disposed facing the platen 3. A distance sensor S is provided on a side along the Y-axis of the carriage 11. As the distance sensor S, a distance sensor S1 is disposed on a side in the +X direction of the carriage 11, and a distance sensor S2 is disposed on a side in the −X direction of the carriage 11. Note that, the number of the distance sensors S is not limited to two. For example, an embodiment may be adopted in which one of the distance sensor S1 and the distance sensor S2 is included.

The distance sensor S is scanned in the X direction relative to the recording medium P along with the carriage 11. The distance sensor S detects, in the recording medium P, a surface state of a region where recording of a test pattern described later is performed by the recording head H.

Specifically, the distance sensor S measures a height of the recording medium P at a plurality of locations in the X direction of the test pattern while being scanned in the X direction intersecting the +Y direction. The measurement by the distance sensor S is performed immediately after the recording of the test pattern by the recording head H. Specifically, while the carriage 11 is scanned in the −X direction, measurement by the distance sensor S1 is performed for a region to which the recording head H causes an ink droplet to adhere as the test pattern. While the carriage 11 is scanned in the +X direction, measurement by the distance sensor S2 is performed for a region to which the recording head H causes an ink droplet to adhere as the test pattern.

The height of the recording medium P here is a numerical value, measured by the distance sensor S, and calculated from a distance between the distance sensor S and an upper surface of the recording medium P. The distance sensor S detects wrinkles generated in the recording medium P by measuring heights at a plurality of locations in the recording medium P. Note that, the wrinkles in the recording medium P in the present specification are wrinkles caused by heating, and do not include so-called cockling caused by a large amount of ink adhering.

The distance sensor S is a non-contact type distance measurement device. Types of the distance sensor S include an optical type, a sonic type, and an ultrasonic type. In the present exemplary embodiment, as the distance sensor S, an ultrasonic sensor including a thin film piezoelectric element described below is adopted.

The ultrasonic sensor includes a substrate having an opening portion that penetrates in a thickness direction, a vibrating plate that covers the opening portion, a thin film piezoelectric element provided at a position corresponding to an opening portion in a back surface of the vibrating plate, and an elastic layer present on an inner side of the opening portion, and facing the thin film piezoelectric element via the vibrating plate. A vibration region of the vibrating plate and the thin film piezoelectric element constitute one ultrasonic transducer.

In the ultrasonic sensor, by applying a pulse voltage of a predetermined frequency between two electrodes of the thin film piezoelectric element, the thin film piezoelectric element bends and the vibration region vibrates, and ultrasonic waves are transmitted from the opening portion. In addition, when ultrasonic waves propagated toward the ultrasonic sensor vibrate the vibration region of the vibrating plate, a potential difference is generated between the two electrodes of the thin film piezoelectric element. By detecting the potential difference, timing of transmission or reception of ultrasonic waves can be detected. Furthermore, the distance sensor S includes a temperature/humidity sensor, and calculates sound velocity from a temperature and humidity measured. The temperature/humidity sensor need not be disposed at the same position as that of the distance sensor S.

According to the configuration described above, by transmitting ultrasonic waves to a measurement target, and receiving the ultrasonic waves reflected by the measurement target, a distance between the ultrasonic sensor and the measurement target can be measured. Note that, the ultrasonic sensor of the present exemplary embodiment is a small ultrasonic sensor specialized for a case where a target object is at a short distance.

According to the ultrasonic sensor including the thin film piezoelectric element, spatial resolution in distance measurement can be improved compared to an ultrasonic sensor without a thin film piezoelectric element. In addition, miniaturization can be easily achieved compared to an optical type or a sound wave type sensor. Therefore, the distance sensor S is small and lightweight, and is easily mounted at the carriage 11. Furthermore, the ultrasonic sensor also includes an advantage that a measurement result is unlikely to be affected by a color or surface reflectivity of a deposit as a measurement target compared to an optical type sensor.

Here, the distance sensor S is not limited to being mounted at the carriage 11. The distance sensor S may be mounted at a carriage separate from the carriage 11. The separate carriage is disposed in the +Y direction with respect to the carriage 11, and it is sufficient that reciprocation in the X direction is possible by driving a carriage motor in the same manner as the carriage 11.

Further, the recording device 1 is not limited to including the distance sensor S. The distance sensor S may be omitted in consideration of costs and a space for mounting the distance sensor S. In this case, a situation of wrinkles is evaluated visually for the test pattern described below. Specifically, a degree of wrinkles in the recording medium P is determined with a degree of unevenness in the test pattern as an index. As occurrence of wrinkles becomes significant, a location to which an ink droplet adheres is easily displaced with respect to the recording medium P. Therefore, when the degree of wrinkles decreases, the unevenness generated in the test pattern is also significant.

The recording device 1 may include a detector for automatically detecting unevenness of the test pattern instead of the distance sensor S. Examples of such a detector include imaging elements and optical colorimeters. Note that, the recording device 1 may include the detector described above from the perspective of making the heating temperature of the heater 18 more easily set.

Figures 5, 6:
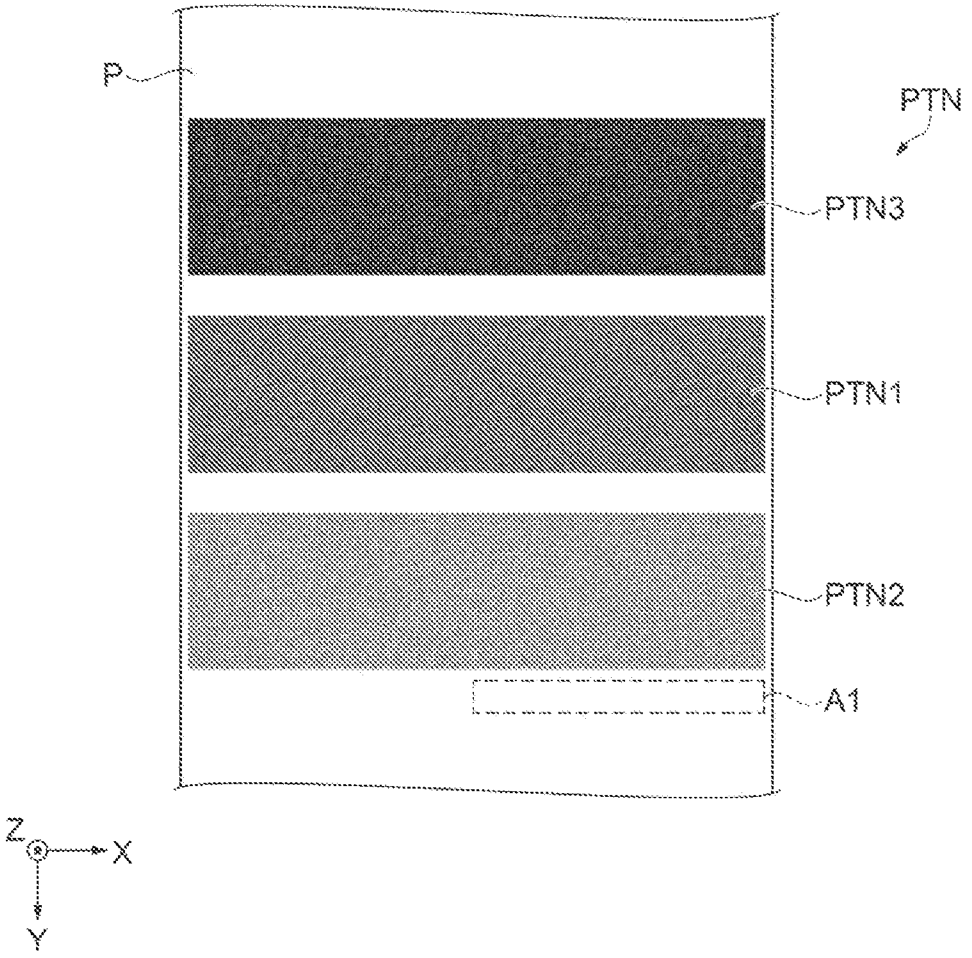
FIG. 5 is a schematic plan view illustrating a configuration of a test pattern.
FIG. 6 is a table showing a relationship between heating temperatures and a recording density.

As illustrated in FIG. 5, a test pattern PTN includes a first test pattern PTN1, a second test pattern PTN2, and a third test pattern PTN3. The test pattern PTN is recorded by control of the control unit described below. In other words, the test pattern PTN is recorded by causing an ink droplet to adhere to the recording medium P from the recording head H scanned in the X direction with respect to the recording medium P transported in the +Y direction by the transporter described above. In the following description, each of the first test pattern PTN1, the second test pattern PTN2, and the third test pattern PTN3 may be referred to as an individual test pattern PTN.

The individual test pattern PTN is substantially rectangular in plan view from above, and a long side thereof is along the X-axis. In the X direction, which is a width direction of the recording medium P, a width of a region in which the individual test pattern PTN is recorded is equal to a maximum width of a region, of the recording medium P in which recording can be performed by the recording head H. That is, a length of the long side of the individual test pattern PTN is equal to or slightly shorter than the width in the X direction of the recording medium P. A slight margin may be provided between a side along the Y-axis of the recording medium P and a short side of the individual test pattern PTN.

In the heating by the heater 18 described above, a variation in temperature may occur in the X direction. Therefore, a temperature distribution can occur also in the X direction in the recording medium P to be heated. In contrast, since the individual test pattern PTN has a shape wide in the X direction, it is easy to grasp the temperature distribution. This makes it possible to improve accuracy when a heating temperature of the heater 18 is tried.

The individual test patterns PTN are separated and recorded in a direction along the Y-axis. Therefore, wrinkles or unevenness is prevented from affecting the individual test patterns PTN adjacent to each other in the direction along the Y-axis. A length in the direction along the Y-axis of the above interval is, for example, approximately 50 mm. A length of a short side along the Y-axis of the individual test pattern PTN is, for example, approximately 200 mm.

In the test pattern PTN, the second test pattern PTN2, the first test pattern PTN1, and the third test pattern PTN3 are disposed in order in the −Y direction. Note that, the disposition and the planar shape of the individual test pattern PTN are not limited to the above. For example, the individual test patterns PTN may be disposed side by side in the X direction. In this case, the interval between the adjacent individual test patterns PTN may be approximately 50 mm, and a length in the width direction of the recording medium P may be divided into substantially three equal parts, to dispose the individual test patterns PTN. At this time, a length in a direction along the Y-axis of the individual test pattern PTN is approximately 200 mm. This reduces an area in which the test pattern PTN is recorded, and thus the recording medium P can be saved.

The test pattern PTN may be provided with a note region A1 for recording various types of information. Examples of the various types of information include recording conditions such as an actual heating temperature in the heater 18, a heating temperature reproduced in a pseudo manner described later, and a recording density. The note region A1 may be provided in the individual test pattern PTN. When wrinkles in the individual test pattern PTN are visually evaluated, or when a degree of wrinkles is automatically determined and then visually confirmed, convenience for a user is improved by the note region A1. Note that, the disposition of the region A1 is not limited to the position illustrated.

The individual test pattern PTN is a solid recording pattern having an individual recording density. The first test pattern PTN1 has a predetermined recording density. The second test pattern PTN2 and the third test pattern PTN3 each have a recording density different from the predetermined recording density. Specifically, the first test pattern PTN1 is associated with a lower heating temperature than the second test pattern PTN2, and has a higher recording density, and is associated with a higher heating temperature than the third test pattern PTN3, and has a lower recording density. The recording density of the first test pattern PTN1, the second test pattern PTN2, and the third test pattern PTN3 can be set in the heater 18, and is associated with the heating temperatures different from each other. The first test pattern PTN1 corresponds to a standard condition.

The recording density is an amount of ink adhering to the recording medium P, and is expressed in % Duty. For example, when the individual test pattern PTN is recorded at image resolution 1440×720 dpi (Dots Per Inch), % Duty=the number of recorded dots per square inch/(1440×720)×100.

The recording density of the individual test pattern PTN is associated with a heating temperature that can be set in the heater 18. Specifically, a temperature of an ink droplet adhering to the recording medium P is lower than a temperature of the recording medium P heated by the heater 18. When the ink adheres to the heated recording medium P, the temperature of the recording medium P decreases due to heat absorption by the ink. There is a positive correlation between an amount of ink adhering to the recording medium P and an amount of decrease in temperature in the recording medium P.

That is, when the amount of ink adhering is large, the temperature of the recording medium P is decreased relatively significantly, and when the amount of ink adhering is small, the temperature of the recording medium P is decreased relatively insignificantly. By varying the amount of ink adhering to the recording medium P to change the amount of decrease in temperature of the recording medium P, a state can be reproduced in which the heating temperature of the heater 18 is changed in a pseudo manner.

Specifically, as illustrated in FIG. 6, when the heating temperature of the heater 18 is set to 40° C., the recording density of the first test pattern PTN1 is set to 100% Duty, and a heating temperature that is reproduced in a pseudo manner is assumed to be 40° C. Even in the first test pattern PTN1 used as the standard condition, a decrease in temperature due to adhesion of ink occurs. Therefore, the above assumption is used for convenience. Note that, the recording density of the test pattern PTN used as the standard condition does not need to be 100% Duty.

In contrast, when the recording density of the second test pattern PTN2 is set to 10% Duty, a heating temperature that is reproduced in a pseudo manner is 45° C. When the recording density of the third test pattern PTN3 is set to 200% Duty, a heating temperature that is reproduced in a pseudo manner is 35° C.

At this time, with respect to the first test pattern PTN1 used as the standard condition, in the second test pattern PTN2, an amount of change in a recording density is −90% Duty, and an amount of change in heating temperature that is reproduced in a pseudo manner with respect to the heater 18 is 5° C. With respect to the first test pattern PTN1 used as the standard condition, in the third test pattern PTN3, an amount of change in a recording density is 100% Duty, and an amount of change in heating temperature that is reproduced in a pseudo manner with respect to the heater 18 is −5° C. Note that, the numerical values in FIG. 6 and the correlation described above are examples, and the present disclosure is not limited thereto.

Association information, that associates the amount of change in a recording density and the amount of change in a heating temperature of the heater 18 that is reproduced in a pseudo manner described above, may be stored in advance in a Read Only Memory (ROM) of the control unit described below. That is, the individual test pattern PTN may be automatically selected according to the above association information held by the control unit.

In addition, the recording density of the test pattern PTN may be selected, depending on intention of a user of the recording device 1. In this case, a numerical value difference between a predetermined and constant heating temperature of the heater 18, and a heating temperature desired for a trial may be input by the user via a PC (Personal Computer) described below. Alternatively, the predetermined and constant heating temperature of the heater 18, and the heating temperature desired for a trial may be input by the user via the PC. According to the heating temperature input for a trial, the individual test pattern PTN with a recording density corresponding to the heating temperature is selected and set.

Here, in a disposition where the recording density of the individual test patterns PTN increases along the −Y direction, a heating temperature that is reproduced lowers along the −Y direction. In this case, in the individual test pattern PTN, a region where the distance sensor S measures a height may be located near a long side in the −Y direction. This is because, in the individual test pattern PTN with a low recording density, wrinkles are likely to occur in the recording medium P, and wrinkles are to be prevented from affecting the next individual test pattern PTN following the individual test pattern PTN.

Figure 7:
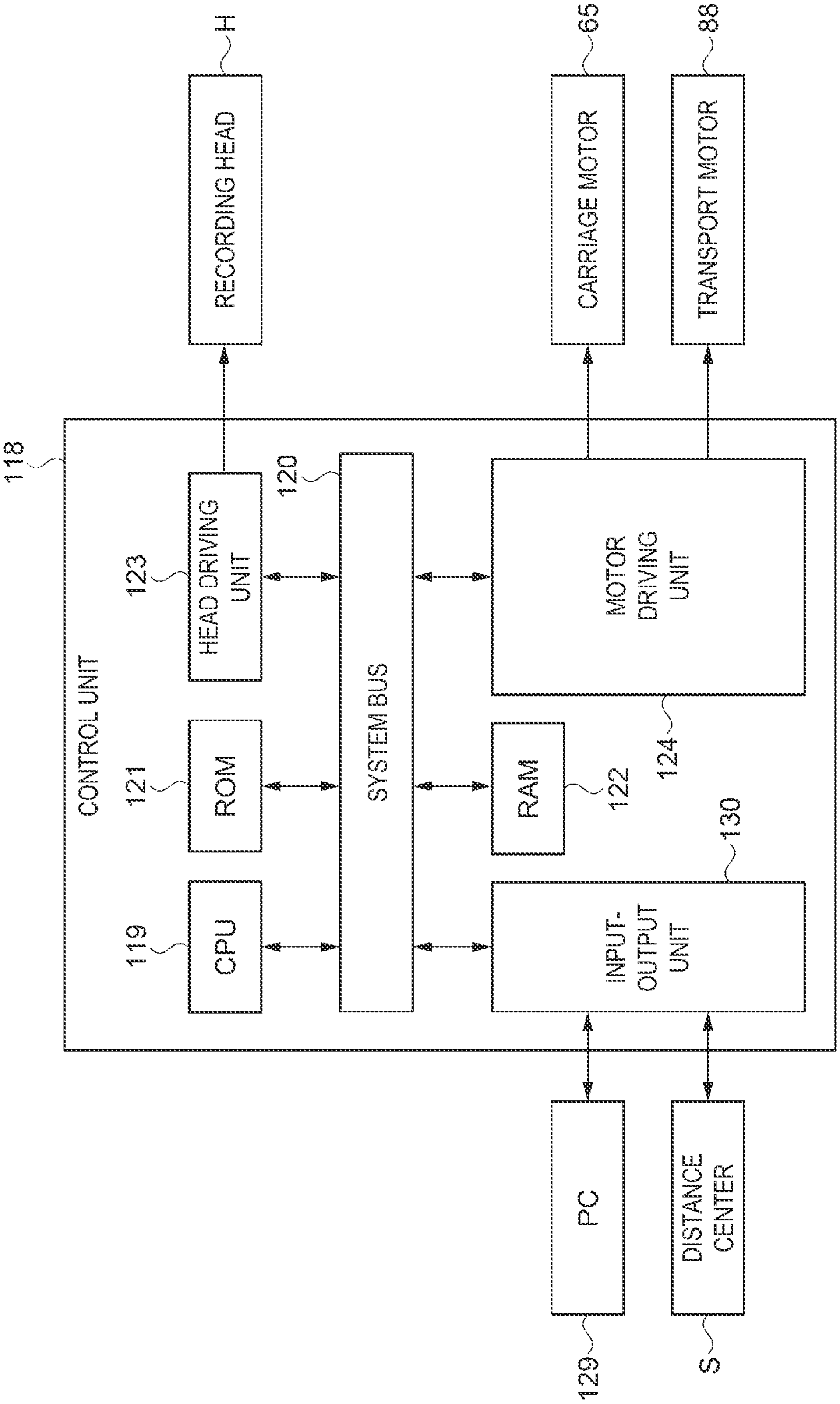
FIG. 7 is a block diagram of the recording device.

As illustrated in FIG. 7, a control unit 118 includes a CPU (Central Processing Unit) 119, a system bus 120, a ROM 121, a RAM (Random Access Memory) 122, a head driving unit 123, a motor driving unit 124, and an input-output unit 130.

The CPU 119 controls the entire recording device 1. The CPU 119 is electrically coupled to the ROM 121, the RAM 122, and the head driving unit 123 via the system bus 120. The ROM 121 stores various control programs, maintenance sequences, and the like executed by the CPU 119. The RAM 122 temporarily stores data. The head driving unit 123 drives the recording head H.

The CPU 119 is electrically coupled to the motor driving unit 124 via the system bus 120. The motor driving unit 124 is electrically coupled to a carriage motor 65 and a transport motor 88.

The carriage motor 65 is included in the carriage driving unit described above. The carriage motor 65 reciprocates the carriage 11 in the X direction. The transport motor 88 drives the driving roller 5 described above to transport the recording medium P.

The CPU 119 is electrically coupled to the input-output unit 130 via the system bus 120. The input-output unit 130 is electrically coupled to the distance sensor S and a PC (Personal Computer) 129. The PC 129 is an information device that inputs recorded data and the like to the recording device 1.

The distance sensor S measures a height of a region, in the recording medium P, where heating at the predetermined and constant heating temperature by the heater 18, and recording of the test pattern PTN by the recording head H are performed. The predetermined and constant heating temperature here refers to, for example, the heating temperature in the first test pattern PTN1, which is the standard condition, and the heating temperature reproduced in a pseudo manner.

The distance sensor S may measure a height of a region where the test pattern PTN is not recorded, for example, a region where nothing is recorded, or a region where an image and the like other than the test pattern PTN are recorded.

The control unit 118 controls heating by the heater 18. The control unit 118 causes the heater 18 to heat the recording medium P supported by the platen 3 at the predetermined and constant heating temperature. The control unit 118 causes the recording head H and the transporter to record the test pattern PTN on the recording medium P. At this time, the control unit 118 may cause recording to be performed, of the test pattern PTN with a recording density associated with a heating temperature of the heater 18, based on the above association information stored in the ROM 121.

Specifically, in the example described above, the test pattern PTN of the recording density associated with the heating temperature 40° C. reproduced in a pseudo manner is the first test pattern PTN1. The test pattern PTN with the recording density associated with the heating temperature 45° C. reproduced in a pseudo manner is the second test pattern PTN2. The test pattern PTN of the recording density associated with the heating temperature 35° C. reproduced in a pseudo manner is the third test pattern PTN3.

By the control unit 118 holding the association information described above, a recording density associated with a heating temperature for a trial can be easily set and reproduced.

The control unit 118 controls the transporter so that transport velocity when the individual test pattern PTN is recorded is equal to transport velocity when a recording medium is discharged after recording. In this way, a variation is less likely to occur in a time during which the recording medium P and the heater 18 come close to each other. Therefore, a difference is less likely to occur in a time during which the test pattern PTN is heated by the heater 18, and accuracy of a trial for a heating temperature is improved.

The control unit 118 determines whether the heating temperature reproduced in a pseudo manner corresponding to the recording density of the test pattern PTN is appropriate or not, based on a measurement result of a height, which is a detection result by the distance sensor S. Specifically, the control unit 118 calculates, from heights at a plurality of locations measured by the distance sensor S, a height difference among the plurality of locations in the individual test pattern PTN. The higher a degree of wrinkles generated in the recording medium P, the smaller the above height difference.

The control unit 118 determines, for the individual test pattern PTN for which the above height difference is within a predetermined range, a heating temperature reproduced in a pseudo manner corresponding to a recording density is appropriate. In other words, the control unit 118 determines the above heating temperature reproduced in a pseudo manner is a heating temperature to be actually set in the heater 18. The predetermined range of the height difference is, for example, equal to or less than 1.8 mm.

The control unit 118, when a plurality of levels of heating temperatures reproduced in a pseudo manner are determined to be appropriate, selects a low level of a heating temperature. As a result, the heating temperature of the heater 18 can be set to low, to reduce power consumption of the recording device 1, and an effect of heat on the recording medium P.

A degree of wrinkles generated in the recording medium P is determined from the above higher difference in the individual test pattern PTN. Then, whether the heating temperature reproduced in a pseudo manner corresponding to the recording density of the individual test pattern PTN is appropriate or not is automatically determined. The number of trials for a heating temperature by the heater 18 using the test pattern PTN is not limited to one, and the trial may be performed for a plurality of times while the recording density of the individual test pattern PTN is changed.

The control unit 118 sets, in the heater 18, the heating temperature reproduced in a pseudo manner corresponding to the individual test pattern PTN that is determined to be appropriate. As a result, an appropriate heating temperature of the heater 18 is set automatically, so time and effort can be omitted as compared to manual setting.

The control unit 118 may notify the user of the recording device 1, of the heating temperature reproduced in a pseudo manner corresponding to the individual test pattern PTN that is determined to be appropriate. Examples of a notification unit include a display panel (not illustrated) provided in the recording device 1, the PC 129, and the like. This makes it possible to improve convenience of the user of the recording device 1, when an appropriate heating temperature of the heater 18 is manually set. Note that, the control unit 118, when a plurality of levels of heating temperatures reproduced in a pseudo manner are determined to be appropriate, displays that a low level of a heating temperature is selected. Examples of contents of the display include a mark display, a note, a highlight display, and the like.

According to the present exemplary embodiment, the following advantages can be obtained. In the recording device 1, an appropriate heating temperature of the heater 18 can be easily set. Specifically, without changing a heating temperature of the heater 18 with respect to the recording medium P, the third test pattern PTN3 having a lower heating temperature to be reproduced, and the second test pattern PTN2 having a higher heating temperature to be reproduced, than the first test pattern 1, are recorded on the recording medium P. Therefore, a high heating temperature and a low heating temperature can be reproduced at a time, for the first test pattern PTN, which is a standard condition. This makes it possible to more efficiently perform a trial for a heating temperature. In other words, it is possible to provide the recording device 1 and a recording method for the recording device 1 for easily setting the appropriate heating temperature of the heater 18.

2. Second Exemplary Embodiment

In a recording device according to the present exemplary embodiment, the configuration of the test pattern PTN recorded on the recording medium P is changed with respect to the recording device 1 of the first exemplary embodiment. In the following description, the same components as those in the first exemplary embodiment are given the same reference signs, and redundant descriptions of these components will be omitted.

In the present exemplary embodiment, the control unit 118 causes a single test pattern with a predetermined recording density to be recorded on the recording medium P. The test pattern of the exemplary embodiment described above includes the first test pattern PTN1, the second test pattern PTN2, and the third test pattern PTN3, but the present exemplary embodiment differs in this point.

Specifically, in the present exemplary embodiment, any one of the individual test patterns PTN of the above-described exemplary embodiments is recorded as a test pattern. The present exemplary embodiment may be employed, when an appropriate heating temperature is empirically clear, to confirm appropriateness.

According to the present exemplary embodiment, the following advantages can be obtained. In the recording device, an appropriate heating temperature of the heater 18 can be easily set. Specifically, even if a heating temperature is confirmed to be inappropriate, it is possible to print the test pattern PTN corresponding to another heating temperature immediately for a trial, without changing a heating temperature of the heater 18.

What is claimed is:

1. A recording device, comprising:

a recorder configured to apply a liquid droplet to a recording medium to record an image;

a transporter configured to transport the recording medium in a transport direction via a region facing the recorder;

a supporter configured to support the recording medium in the region facing the recorder;

a heater configured to heat the recording medium supported by the supporter; and a controller configured to control the recorder, the transporter, and the heater, wherein the controller causes the heater to heat, at a predetermined and constant heating temperature, the recording medium supported by the supporter, and causes the recorder and the transporter to record, on the recording medium as a test pattern, a first test pattern of a predetermined recording density, a second test pattern of a recording density different from the predetermined recording density, and a third test pattern of a recording density different from the predetermined recording density, the recording density of the first test pattern, the recording density of the second test pattern, and the recording density of the third test pattern are settable in the heater, and are associated with heating temperatures different from each other, and wherein the controller records, on the recording medium, as the test pattern, the first test pattern, the second test pattern, and the third test pattern, and the first test pattern is the test pattern having a higher recording density associated with a lower heating temperature than the second test pattern, and is the test pattern having a lower recording density associated with a higher heating temperature than the third test pattern.

2. The recording device according to claim 1, including association information associating an amount of change in a recording density and an amount of change in a heating temperature of the heater, wherein the controller records, based on the association information, the test pattern of the recording density associated with the heating temperature.

3. The recording device according to claim 1, comprising:

a detector configured to detect a surface state of a region, in the recording medium, subjected to the heating at the predetermined and constant heating temperature by the heater, and the recording of the test pattern by the recorder, wherein the controller determines, based on a result of the detection by the detector, whether a heating temperature corresponding to the recording density of the test pattern is appropriate.

4. The recording device according to claim 3, wherein the controller sets, in the heater, a heating temperature corresponding to the test pattern determined to be appropriate.

5. The recording device according to claim 3, wherein the controller notifies the heating temperature corresponding to the test pattern, determined to be appropriate.

6. The recording device according to claim 3, wherein the detector measures a height of the recording medium at a plurality of locations in a direction intersecting the transport direction, and the controller calculates a height difference between the plurality of locations from the heights measured by the detector at the plurality of locations, and determines, to be appropriate, a heating temperature corresponding to the recording density of the test pattern with the height difference within a predetermined range.

7. The recording device according to claim 1, further comprising detector configured to detect a surface state of a region, in the recording medium, subjected to the heating at the predetermined and constant heating temperature b the heater, wherein the detector includes an ultrasonic sensor including a thin film piezoelectric element.

8. The recording device according to claim 1, comprising: a preheater configured to heat the recording medium before recording by the recorder, the preheater being provided upstream of the heater in the transport direction, wherein the controller sets a heating temperature of the preheater to be higher than the predetermined and constant heating temperature by the heater.

9. The recording device according to claim 1, wherein in a width direction of the recording medium, a width of a region in which the first test pattern is recorded and a width of a region in which the second test pattern is recorded are identical to a maximum width of a region, of the recording medium, in which recording is performable by the recorder, and the first test pattern and the second test pattern are recorded in a state of being separated from each other in the transport direction of the recording medium.

10. A recording method for a recording device, the recording device including:

a recorder configured to apply a liquid droplet to a recording medium to record an image, a transporter configured to transport the recording medium in a transport direction via a region facing the recorder, a supporter configured to support the recording medium in the region facing the recorder, and a heater for heating the recording medium supported by the supporter, the recording method comprising:

heating, by the heater, at a predetermined and constant heating temperature, the recording medium supported by the supporter;

recording, by the recorder and the transporter, on the recording medium as a test pattern, a first test pattern of a predetermined recording density, a second test pattern of a recording density different from the predetermined recording density, and a third test pattern of a recording density different from the predetermined recording density, the recording density of the first test pattern, the recording density of the second test pattern, and the recording density of the third test pattern being settable in the heater, and being associated with heating temperatures different from each other; and determining whether the heating temperature corresponding to the recording density of the test patterns is appropriate, based on a surface state of a region subjected to the heating by the heater at the predetermined and constant heating temperature, and the recording of the test pattern by the recorder, wherein the first text pattern is the text pattern having a higher recording density associated with a lower heating temperature than the second test pattern, and is the text pattern having a lower recording density associated with a higher heating temperature than the third text pattern.

* * * * *